United States Patent
Degner et al.

(10) Patent No.: US 10,137,798 B2
(45) Date of Patent: Nov. 27, 2018

(54) BUSBARS FOR A POWER MODULE ASSEMBLY

(71) Applicant: Ford Global Technologies, LLC, Dearborn, MI (US)

(72) Inventors: Michael W. Degner, Novi, MI (US); Guangyin Lei, Dearborn Heights, MI (US); Chingchi Chen, Ann Arbor, MI (US); Edward Chan-Jiun Jih, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 712 days.

(21) Appl. No.: 14/817,314

(22) Filed: Aug. 4, 2015

(65) Prior Publication Data

US 2017/0036563 A1    Feb. 9, 2017

(51) Int. Cl.
| | |
|---|---|
| *B60L 15/04* | (2006.01) |
| *B60L 15/20* | (2006.01) |
| *B60L 11/12* | (2006.01) |
| *B60L 11/14* | (2006.01) |
| *B60L 11/18* | (2006.01) |
| *B60K 1/04* | (2006.01) |

(52) U.S. Cl.
CPC .............. *B60L 15/04* (2013.01); *B60L 11/123* (2013.01); *B60L 11/14* (2013.01); *B60L 11/1861* (2013.01); *B60L 15/2054* (2013.01); *B60K 1/04* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60L 2250/26* (2013.01); *H01M 2220/20* (2013.01); *Y02T 10/645* (2013.01); *Y02T 10/72* (2013.01); *Y02T 10/7275* (2013.01)

(58) Field of Classification Search
CPC ....................................................... B60L 15/04
USPC ........................................................... 307/9.1
See application file for complete search history.

(56) References Cited

U.S. PATENT DOCUMENTS

| | | | |
|---|---|---|---|
| 6,618,278 B2 | 9/2003 | Suzuki et al. | |
| 6,987,670 B2 * | 1/2006 | Ahmed | H01L 24/49 165/80.4 |
| 7,301,755 B2 * | 11/2007 | Rodriguez | H05K 7/1432 165/185 |
| 7,719,838 B2 * | 5/2010 | Nakajima | H02M 7/003 165/104.33 |
| 7,835,151 B2 * | 11/2010 | Olesen | H01L 23/473 165/121 |

(Continued)

*Primary Examiner* — Adi Amrany
(74) *Attorney, Agent, or Firm* — David B. Kelley; Brooks Kushman P.C.

(57) ABSTRACT

A vehicle power module assembly is provided. The assembly many include an array of stacked frames, a power stage housed within each of the frames, and busbars. Each of the power stages may include a pair of opposite polarity terminals extending therefrom. The busbars may be dispersed along the array to electrically connect like polarity terminals. The power stages may be arranged with one another such that like polarity terminals are adjacent one another and the busbars define an alternating sequence corresponding to the polarity of the terminals. The terminals may be located on the respective power stages such that the busbars are alternately dispersed in a linear sequence along a side face defined by portions of the frames.

19 Claims, 6 Drawing Sheets

(56) References Cited

U.S. PATENT DOCUMENTS

| | | | |
|---|---|---|---|
| 7,952,875 B2* | 5/2011 | Woody | H01L 23/473 |
| | | | 361/699 |
| 8,064,234 B2* | 11/2011 | Tokuyama | H01L 23/473 |
| | | | 363/141 |
| 8,410,640 B2 | 4/2013 | Gotou | |
| 9,620,292 B2* | 4/2017 | Wen | H02M 7/003 |
| 9,848,519 B2* | 12/2017 | Lei | H05K 7/20927 |
| 9,919,608 B2* | 3/2018 | Wang | B60L 11/1803 |
| 2004/0228094 A1* | 11/2004 | Ahmed | H01L 25/072 |
| | | | 361/702 |
| 2006/0007721 A1* | 1/2006 | Rodriguez | H02M 7/003 |
| | | | 363/146 |
| 2007/0109715 A1* | 5/2007 | Azuma | B60K 6/28 |
| | | | 361/299.3 |
| 2007/0253164 A1* | 11/2007 | Matsuo | H01L 23/473 |
| | | | 361/699 |
| 2008/0049476 A1* | 2/2008 | Azuma | B60L 3/12 |
| | | | 363/131 |
| 2008/0251909 A1* | 10/2008 | Tokuyama | H01L 23/473 |
| | | | 257/706 |
| 2009/0231811 A1* | 9/2009 | Tokuyama | H01L 23/36 |
| | | | 361/699 |
| 2011/0181105 A1* | 7/2011 | Michinaka | H01L 25/162 |
| | | | 307/9.1 |
| 2011/0304948 A1 | 12/2011 | Lee et al. | |
| 2012/0300522 A1* | 11/2012 | Tokuyama | H01L 25/072 |
| | | | 363/131 |
| 2013/0170141 A1* | 7/2013 | Hankamaki | H05K 7/20927 |
| | | | 361/699 |
| 2014/0085955 A1 | 3/2014 | Maeda et al. | |
| 2015/0287665 A1* | 10/2015 | Hanada | H01L 25/115 |
| | | | 257/691 |
| 2016/0226396 A1* | 8/2016 | Hattori | H02M 7/003 |
| 2016/0303995 A1* | 10/2016 | Lei | B60L 15/007 |
| 2016/0308480 A1* | 10/2016 | Wang | B60L 11/1803 |
| 2016/0308481 A1* | 10/2016 | Lei | H05K 7/1432 |
| 2016/0309614 A1* | 10/2016 | Kikuchi | H05K 7/2089 |
| 2016/0309624 A1* | 10/2016 | Lei | H05K 7/20927 |
| 2016/0374229 A1* | 12/2016 | Nishikimi | H02M 7/003 |
| 2017/0033593 A1* | 2/2017 | Kamizuma | H02M 7/217 |
| 2017/0033704 A1* | 2/2017 | Lei | B60R 16/03 |
| 2017/0040906 A1* | 2/2017 | Hattori | H02M 7/48 |
| 2017/0223875 A1* | 8/2017 | Tsuyuno | H05K 7/20927 |

\* cited by examiner

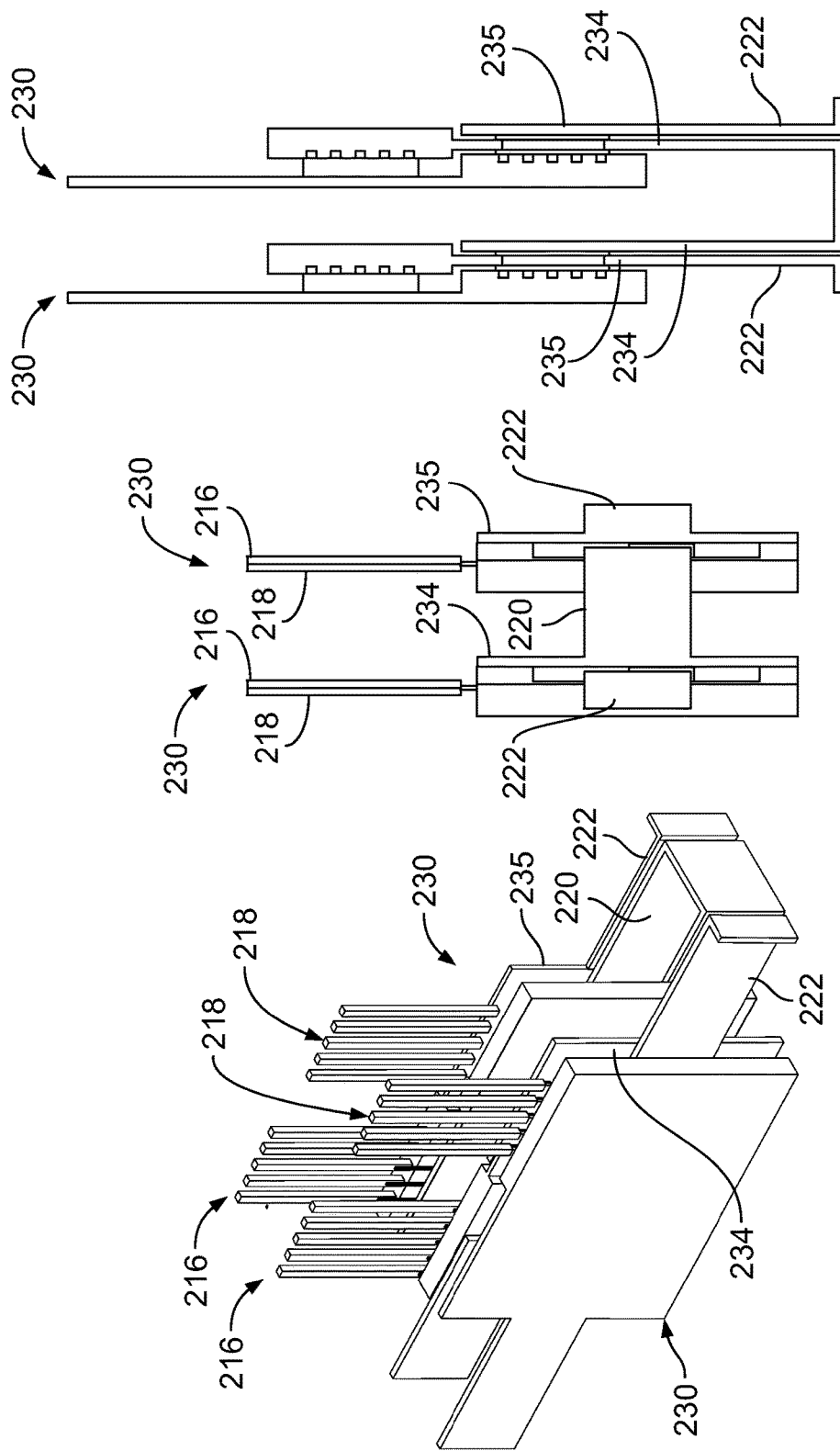

BUSBARS FOR A POWER MODULE ASSEMBLY

TECHNICAL FIELD

The present disclosure relates to power module assemblies for automotive vehicles.

BACKGROUND

Electrified vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery. A power inverter can be electrically connected between the battery and any electric machines to convert direct current from the battery to alternating current for the electric machines. The power inverter may also convert alternating current from the electric machines to direct current for the battery. Components, such as busbars, may assist in electrically connecting the power inverters to one another.

SUMMARY

A vehicle power module assembly includes an array of stacked frames, a power stage housed within each of the frames, and busbars. Each of the power stages includes a pair of opposite polarity terminals extending therefrom. The busbars are dispersed along the array to electrically connect like polarity terminals. The power stages are arranged with one another such that like polarity terminals are adjacent one another and the busbars define an alternating sequence corresponding to the polarity of the terminals. Each of the terminals may further define a surface sized to join electrical components. The terminals may be located on the respective power stages such that the busbars are alternately dispersed in a linear sequence along a side face defined by portions of the frames. The terminals of opposite polarity may be offset from one another such that the busbars are alternately dispersed and spaced apart from one another according to terminal polarity along a side face defined by the frames. The terminals may include outer terminals, one on each end of the stacked frames and of opposite polarity. A protective layer may be molded over and covering the array of stacked frames such that the terminals extend through the layer. Each of the busbars may be secured to terminals of a same polarity of two power stages adjacent one another.

A vehicle power module assembly includes an array of stacked power stages. Each power stage includes a pair of DC terminals of opposite polarity spaced apart from one another and arranged relative to one another such that adjacent terminals from different power stages have a same polarity. A first busbar electrically connects two adjacent positive terminals. A second busbar electrically connects two adjacent negative terminals. The power stages may be supported by external frames defining passthroughs sized for the terminals to extend therethrough. The first and second busbars may be U-shaped. The busbars may define a surface parallel with a side surface of the external frames. The surface may be sized to facilitate a joining with a connector of a capacitor module. The array of stacked power stages may include outer power stages adjacent respective endplates. The terminals proximate the endplates may be of opposite polarity from one another. The assembly may also include a housing defined by a layer molded over and covering the array of stacked power stages such that the terminals extend through the layer. Each busbar may include an outer surface defining a plane coplanar with other planes defined by other outer surfaces of other busbars.

A vehicle includes an electric machine, a traction battery electrically connected to the electric machine, and a power module assembly. The power module assembly includes at least two power stages electrically connected between the battery and electric machine and each has a pair of DC terminals of opposite polarity and a pair of first connectors each connected to one of each of the terminals. Each of a plurality of busbars has second connectors for electrical connection with the first connectors. The power stages are arranged with one another such that like polarity terminals are adjacent one another and arranged in a terminal polarity alternating sequence. Each of the busbars may be U-shaped. The second connectors of each busbar may be electrically connected to two different power stages with first connectors of same polarity. The power stages may be supported by external frames defining passthroughs open to the first connectors and sized to receive a portion of one of the busbars. A distance between two adjacent busbars may be based on a preselected amount of current and a material of the DC terminals. The power stages may be supported by external frames and the terminals may be located on the respective power stages such that the busbars are alternately dispersed in a linear sequence along a side face defined by portions of the frames. The power stages may be supported by external frames and the terminals of opposite polarity may be offset from one another such that the busbars are alternately dispersed and spaced apart from one another according to polarity along a side face defined by the frames.

BRIEF DESCRIPTION OF THE DRAWINGS

FIG. 4A is a perspective view of an example of a power stage which may be included in the portion of the power module assembly of FIG. 3.

FIG. 4B is a front view of the power stage of FIG. 4A.

FIG. 4C is a plan view of the power stage of FIG. 4A.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
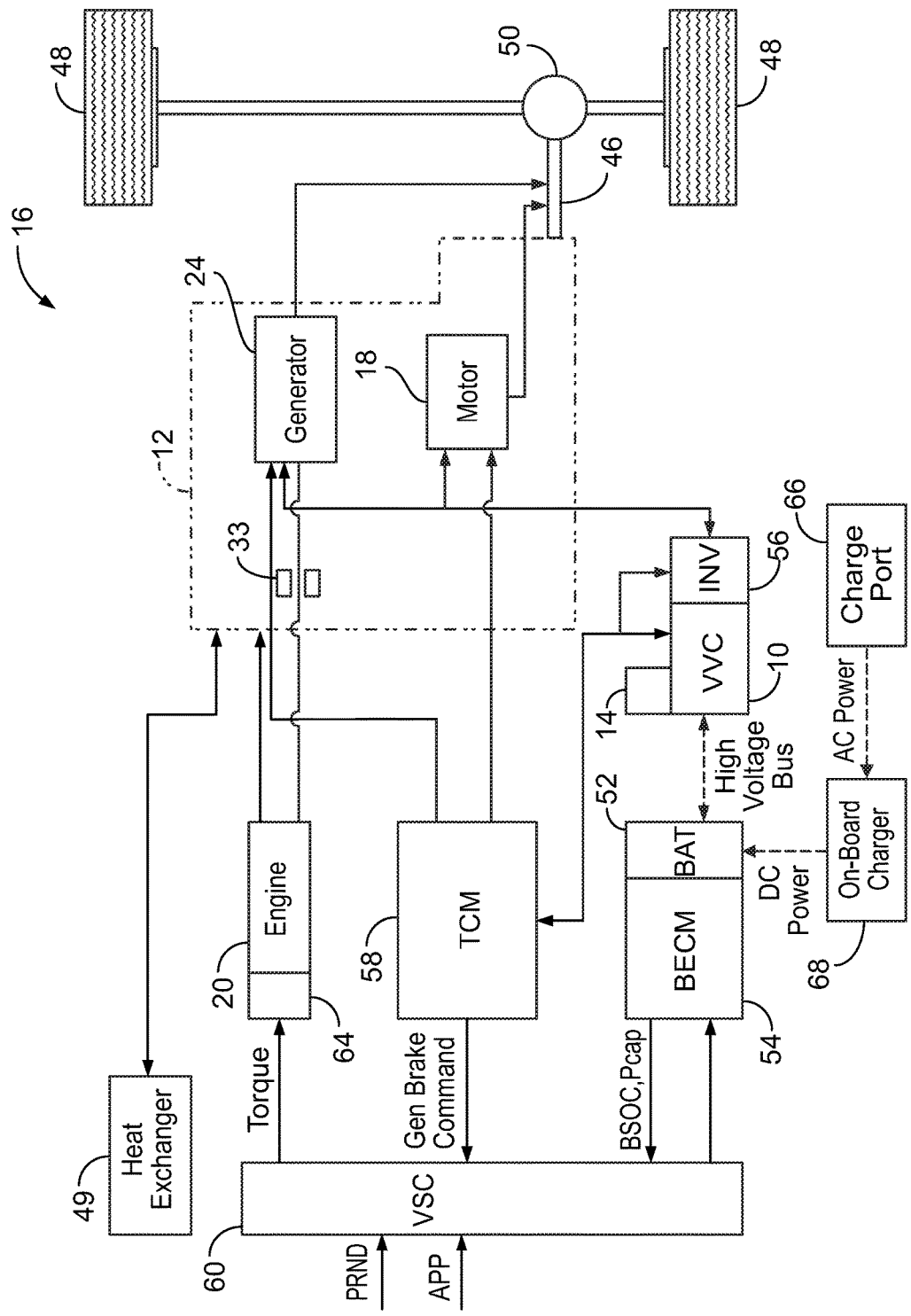
FIG. 1 is a schematic diagram of an example hybrid vehicle.

An example of a PHEV is depicted in FIG. 1, referred to generally as a vehicle 16 herein. The vehicle 16 may include a transmission 12 and is an example of an electric vehicle propelled by an electric machine 18 with assistance from an internal combustion engine 20. The vehicle 16 may be connectable to an external power grid. The electric machine 18 may be an AC electric motor depicted as a motor 18 in FIG. 1. The electric machine 18 receives electrical power and provides torque for vehicle propulsion. The electric machine 18 may also function as a generator for converting mechanical power into electrical power through regenerative braking.

The transmission 12 may be a power-split configuration. The transmission 12 may include the first electric machine 18 and a second electric machine 24. The second electric machine 24 may be an AC electric motor depicted as a generator 24 in FIG. 1. Similar to the first electric machine 18, the second electric machine 24 may receive electrical power and provide output torque. The second electric machine 24 may also operate as a generator for converting mechanical power into electrical power and optimizing power flow through the transmission 12. In other embodiments, the transmission may not have a power-split configuration.

The transmission 12 may include a planetary gear unit (not shown) and may operate as a continuously variable transmission and without any fixed or step ratios. The transmission 12 may also include a one-way clutch (O.W.C.) and a generator brake 33. The O.W.C. may be coupled to an output shaft of the engine 20 to control a direction of rotation of the output shaft. The O.W.C. may prevent the transmission 12 from back-driving the engine 20. The generator brake 33 may be coupled to an output shaft of the second electric machine 24. The generator brake 33 may be activated to "brake" or prevent rotation of the output shaft of the second electric machine 24 and of the sun gear 28. Alternatively, the O.W.C. and the generator brake 33 may be replaced by implementing control strategies for the engine 20 and the second electric machine 24. The transmission 12 may be connected to a driveshaft 46. The driveshaft 46 may be coupled to a pair of drive wheels 48 through a differential 50. An output gear (not shown) of the transmission may assist in transferring torque between the transmission 12 and the drive wheels 48. The transmission 12 may also be in communication with a heat exchanger 49 or an automatic transmission fluid cooler (not shown) for cooling the transmission fluid.

The vehicle 16 includes an energy storage device, such as a traction battery 52 for storing electrical energy. The battery 52 may be a HV battery capable of outputting electrical power to operate the first electric machine 18 and the second electric machine 24 as further described below. The battery 52 may also receive electrical power from the first electric machine 18 and the second electric machine 24 when they are operating as generators. The battery 52 may be a battery pack made up of several battery modules (not shown), where each battery module contains a plurality of battery cells (not shown). Other embodiments of the vehicle 16 contemplate alternative types of energy storage devices, such as capacitors and fuel cells (not shown) that may supplement or replace the battery 52.

A high voltage bus may electrically connect the battery 52 to the first electric machine 18 and to the second electric machine 24. For example, the vehicle 16 may include a battery energy control module (BECM) 54 for controlling the battery 52. The BECM 54 may receive input indicative of certain vehicle conditions and battery conditions, such as battery temperature, voltage, and current. The BECM 54 may calculate and estimate parameters of the battery 52, such as a battery state of charge (BSOC) and a battery power capability (Pcap). The BECM 54 may provide output that is indicative of the BSOC and Pcap to other vehicle systems and controllers.

The vehicle 16 may include a DC-DC converter or variable voltage converter (VVC) 10 and an inverter 56. The inverter 56 may also be referred to as a power module assembly herein. The VVC 10 and the inverter 56 may be electrically connected between the battery 52 and the first electric machine 18 and the second electric machine 24. The VVC 10 may "boost" or increase a voltage potential of electrical power provided by the battery 52. The VVC 10 may also "buck" or decrease voltage potential of the electrical power provided to the battery 52. The inverter 56 may invert DC power supplied by the battery 52 via the VVC 10 to AC power for operating each of the electric machines 18 and 24. The inverter 56 may also rectify AC power provided by each of the electric machines 18 and 24 to DC for charging the battery 52. In other examples, the transmission 12 may operate with multiple inverters, such as one invertor associated with each of the electric machine 18 and 24. The VVC 10 includes an inductor assembly 14 (further described in relation to FIG. 2).

The transmission 12 is shown in communication with a transmission control module (TCM) 58 for controlling the electric machines 18 and 24, the VVC 10, and the inverter 56. The TCM 58 may be configured to monitor conditions of each of the electric machines 18 and 24 such as position, speed, and power consumption. The TCM 58 may also monitor electrical parameters (e.g., voltage and current) at various locations within the VVC 10 and the inverter 56. The TCM 58 provides output signals corresponding to this information for other vehicle systems to utilize.

The vehicle 16 may include a vehicle system controller (VSC) 60 that communicates with other vehicle systems and controllers for coordinating operations thereof. Although shown as a single controller, it is contemplated that the VSC 60 may include multiple controllers to control multiple vehicle systems and components according to an overall vehicle control logic or software.

The vehicle controllers, such as the VSC 60 and the TCM 58, may include various configurations of microprocessors, ASICs, ICs, memory (e.g., FLASH, ROM, RAM, EPROM and/or EEPROM), and software code to cooperate with one another to perform vehicle operations. The controllers may also include predetermined data, or "look up tables," which are accessible from the memory and may be based on calculations and test data. This predetermined data may be utilized by the controllers to facilitate control of the vehicle operations. The VSC 60 may communicate with other vehicle systems and controllers (e.g., the BECM 54 and the TCM 58) over one or more wired or wireless connections using bus protocols such as CAN and LIN. The VSC 60 may receive input (PRND) that represents a current position of the transmission 12 (e.g., park, reverse, neutral or drive). The VSC 60 may also receive input (APP) that represents an accelerator pedal position. The VSC 60 may provide outputs representative of a desired wheel torque, desired engine speed, and a generator brake command to the TCM 58; and contactor control to the BECM 54.

The vehicle 16 may include an engine control module (ECM) 64 for controlling the engine 20. The VSC 60 provides output, such as desired engine torque, to the ECM 64 that may be based on a number of input signals including APP and may correspond to a driver's request for vehicle propulsion.

The battery 52 may periodically receive AC energy from an external power supply or grid via a charge port 66. The vehicle 16 may also include an on-board charger 68 which receives the AC energy from the charge port 66. The charger 68 may include AC/DC conversion capability to convert the received AC energy into DC energy suitable for charging the battery 52 during a recharge operation. Although illustrated and described in the context of a PHEV, it is contemplated that the inverter 56 may be implemented with other types of electrified vehicles, such as a FHEV or a BEV.

Figure 2:
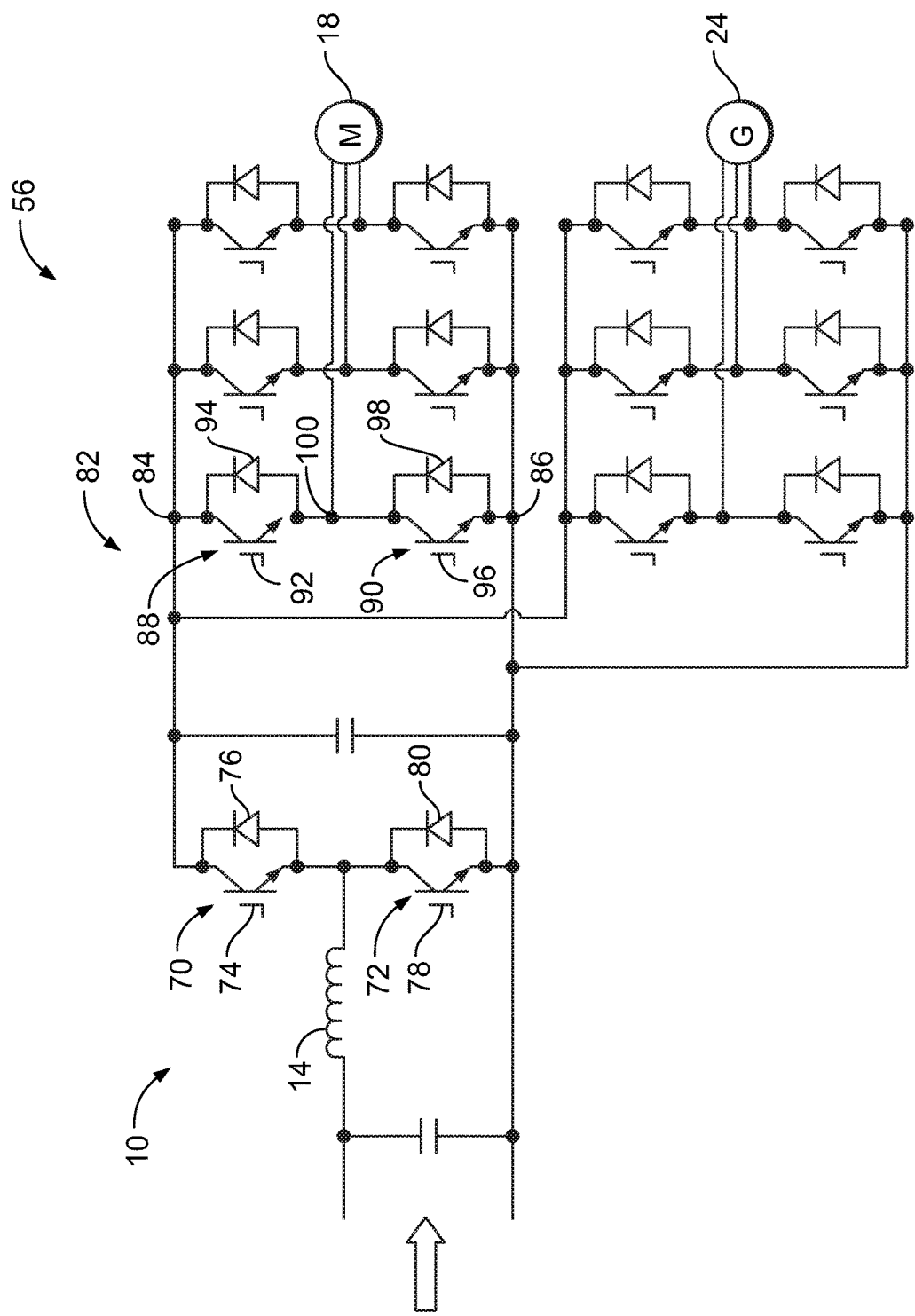
FIG. 2 is a schematic diagram of an example of a variable voltage converter and power inverter.

Referring to FIG. 2, an example of an electrical schematic of the VVC 10 and the inverter 56 is shown. The VVC 10 may include a first switching unit 70 and a second switching unit 72 for boosting the input voltage (V_bat) to provide output voltage (V_dc). The first switching unit 70 is shown with a first transistor 74 connected in parallel to a first diode 76 and with their polarities switched (referred to as anti-parallel herein). The second switching unit 72 is shown with a second transistor 78 connected anti-parallel to a second diode 80. Each of the transistors 74 and 78 may be a type of controllable switch (e.g., an insulated gate bipolar transistor (IGBT) or field-effect transistor (FET)). Additionally, each of the transistors 74 and 78 may be individually controlled by the TCM 58. The inductor assembly 14 is depicted as an input inductor that is connected in series between the battery 52 and the switching units 70 and 72. The inductor assembly 14 may generate magnetic flux when a current is supplied. When the current flowing through the inductor assembly 14 changes, a time-varying magnetic field is created and a voltage is induced. Other embodiments of the VVC 10 may include alternative circuit configurations (e.g., more than two switches).

The inverter 56 may include a plurality of half-bridges 82 stacked in an assembly. Each of the half-bridges 82 may be packaged as a power stage. In the illustrated example, the inverter 56 includes six half-bridges (though FIG. 2 labels only one complete half-bridge 82), three for the motor 18 and three for the generator 24. Each of the half bridges 82 may include a positive DC lead 84 that is coupled to a positive DC node from the battery 52 and a negative DC lead 86 that is coupled to a negative DC node from the battery 52. Each of the half bridges 82 may also include a first switching unit 88 and a second switching unit 90. The first switching unit 88 includes a first transistor 92 connected in parallel to a first diode 94. The second switching unit 90 includes a second transistor 96 connected in parallel to a second diode 98. The first transistor 92 and the second transistors 96 may be IGBTs or FETs. The first switching unit 88 and the second switching unit 90 of each of the half-bridges 82 converts the DC power of the battery 52 into a single phase AC output at the AC lead 100. Each of the AC leads 100 is electrically connected to the motor 18 or generator 24. In this example, three of the AC leads 100 are electrically connected to the motor 18 and the other three AC leads 100 are electrically connected to the generator 24.

Figure 3:
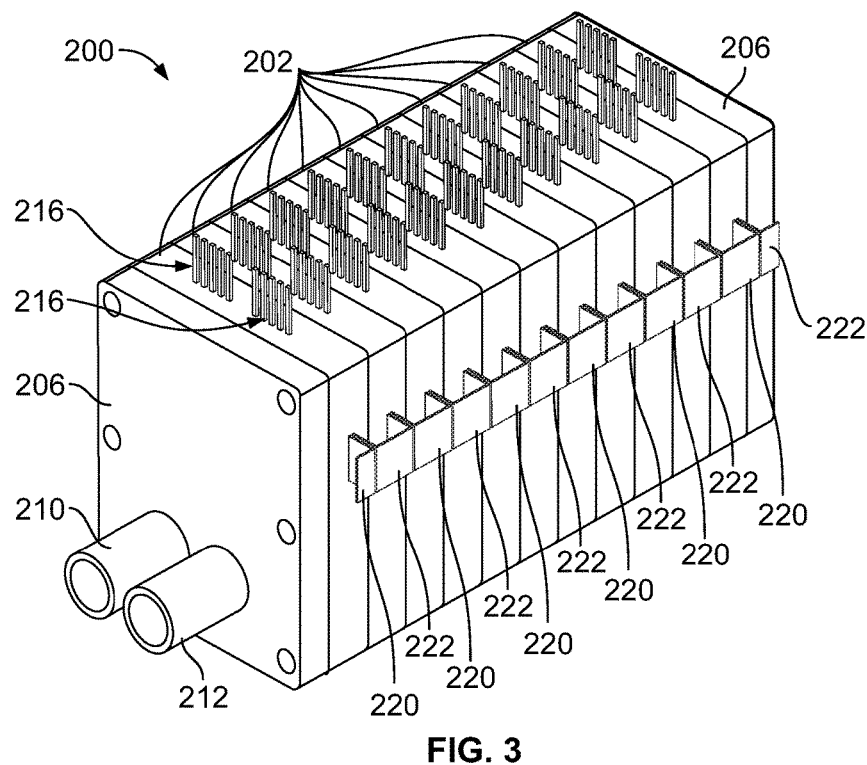
FIG. 3 is a perspective view of an example of a portion of a power module assembly.

FIG. 3 shows an example of a portion of a power module assembly for use with an electrified vehicle, referred to generally as a power module assembly 200 herein. The power module assembly 200 may include a plurality of power stages (not visible in FIG. 3) stacked in an array. Each of the power stages may be supported by a frame, generally referred to as a frame 202 herein. The power module assembly 200 may include a pair of endplates 206 disposed on either end of the stacked frames 202. The endplates 206 may assist in retaining the power modules therebetween. One of the endplates 206 may include an inlet 210 and an outlet 212. The inlet 210 and the outlet 212 may deliver and remove coolant to assist in managing thermal conditions of the power module assembly 200.

Each of the frames 202 may include passthroughs for electrical components to extend therethrough. Portions of each of the frames 202 may collectively define a side face of the power module assembly 200. The electrical components may be connected to a power stage supported by each of the frames 202. The passthroughs may, for example, be sized for a first series of signal pins 216 and a second series of signal pins 218 to extend therethrough. As another example, the passthroughs may be sized for terminals, such as DC terminals, or busbars, such as a first set of busbars 220 and a second set of busbars 222, to extend therethrough. The busbars 220 and the busbars 222 may be dispersed along a side of the power module assembly 200 to electrically connect like polarity terminals of the power stages. For example, each of the busbars 220 may electrically connect two positive terminals from different power stages and each of the busbars 222 may electrically connect two negative terminals from different power stages. The busbars 220 and the busbars 222 may be U-shaped. The busbars 220 and the busbars 222 may each include an outer surface defining a plane coplanar with other planes defined by other outer surfaces of other busbars. The busbars 220 and the busbars 222 may each define a surface on a plane parallel with another plane of a side surface of each of the frames 202.

FIGS. 4A through 4C show an example of a pair of power stages adjacent to one another, each power stage referred to generally as a power stage 230 herein. Each of the power stages 230 may be supported by one of the frames 202 and may assist in electrically connecting a battery and electric machine of a vehicle. Pins from the first series of signal pins 216 and the second series of signal pins 218 are shown connected to each of the power stages 230. Each of the power stages 230 may include a first terminal 234 and a second terminal 235. The first terminal 234 and second terminal 235 may be of opposite polarities. For example, each of the first terminals 234 may be positive and each of the second terminals 235 may be negative. A pair of outer terminals may be located at opposite ends of the power module assembly 200. These outer terminals may be of opposite polarity to one another and assist in electrically connecting an array of the power stages 230 to other components.

As mentioned above, the busbars may electrically connect terminals from adjacent power stages 230. For example, the busbars 220 may electrically connect two first terminals 234 from adjacent power stages 230 and the busbars 222 may electrically connect two second terminals 235 from adjacent power stages 230. In this example the busbars 220 and the busbars 222 may extend through the respective frame 202 for electrical connection with the respective power stage 230. The busbars 220 and the busbars 222 may be spaced apart from respective adjacent busbars at a distance based on a preselected amount of current and a material of the terminals. Multiple configurations of the power stages 230 are available. It is contemplated that the terminals and busbars may have additional configurations than the configurations shown in FIGS. 4A through 4C. For example, the terminals and busbars may have connectors to mate with one another and facilitate electrical connectivity. Alternative locations of the connectors are available to accommodate packaging space and performance requirements of the power module assembly 200.

Figure 5A:
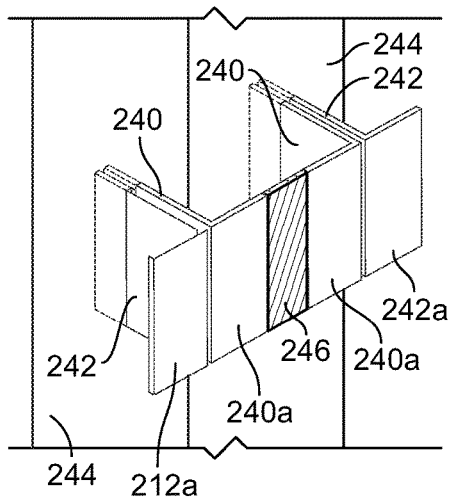
FIG. 5A is a perspective view of an example of a busbar assembly for a power stage.
Figure 6:
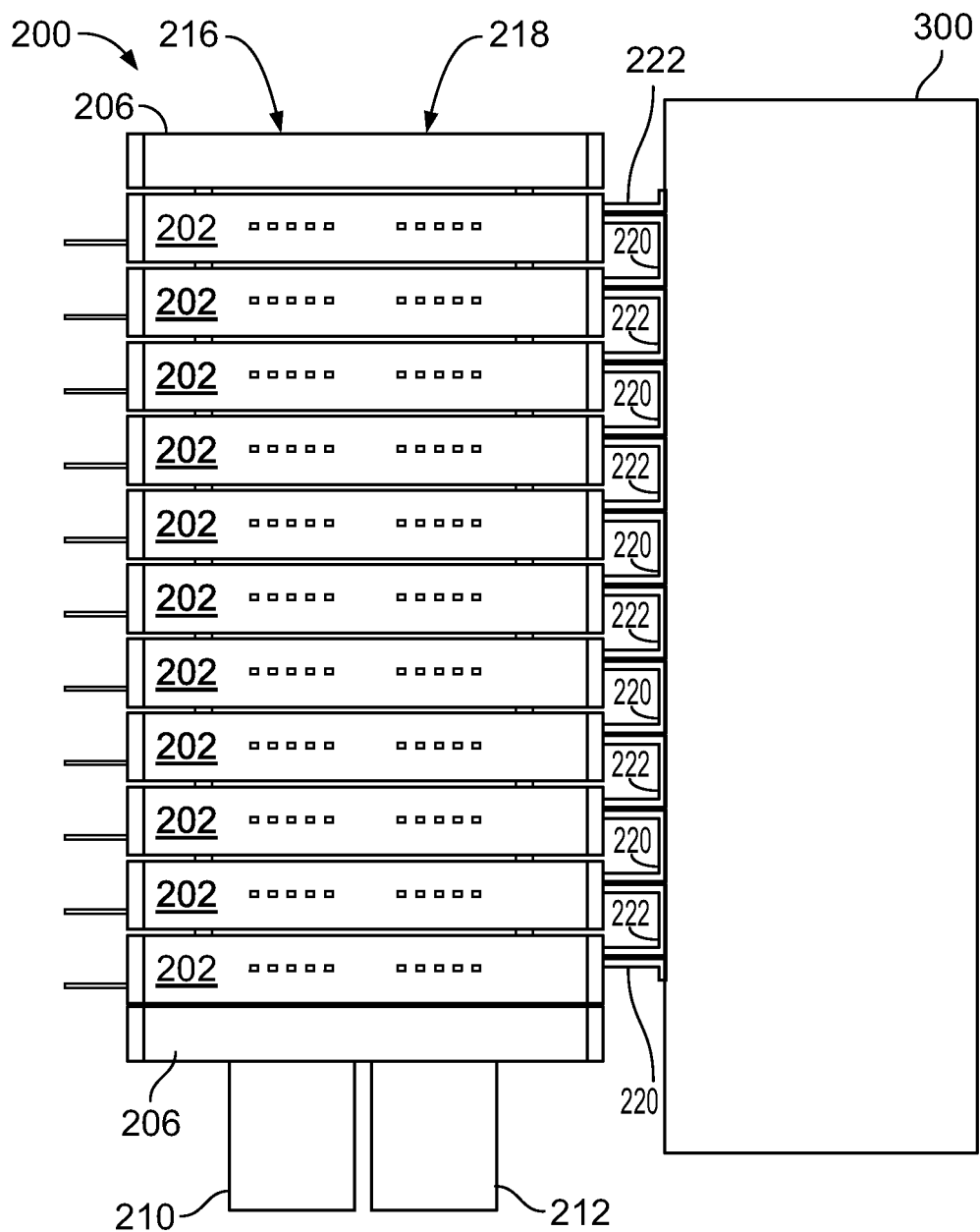
FIG. 6 is a plan view of the portion of the power module assembly of FIG. 3 shown with a capacitor module.

FIG. 5A shows an example in which a positive terminal 240 and a negative terminal 242 extend external to a respective frame 244. In this example, a busbar 246 is shown electrically connecting the positive terminals 240 adjacent to one another. Surfaces 240a and 242a may be coplanar with one another and configured to join with an electrical component such as a capacitor module 300 as shown in FIG. 6 to electrically connect the power stages 230 and the capacity module 300.

Figure 5B:
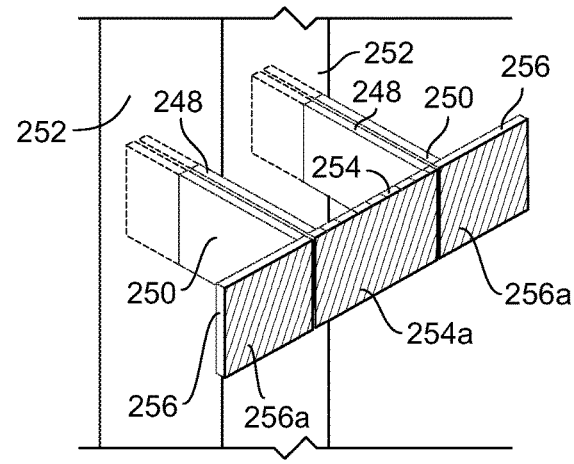
FIG. 5B is a perspective view of an example of a busbar assembly for a power stage.

FIG. 5B shows an example in which a positive terminal 248 and a negative terminal 250 extend external to a frame 252. In this example, a busbar 254 is shown electrically connecting the positive terminals 248 adjacent to one another. The busbar 254 may define a surface 254a coplanar with a surface 256a defined by each of adjacent busbars 256. Surfaces 254a and 256a may be configured to join with an electrical component such as the capacitor module 300 as shown in FIG. 6 to electrically connect the power stages 230 and the capacity module 300.

The power stages 230 may be arranged based on the polarity of the terminals 234 and the terminals 235. For example, power stages 230 of the power module assembly 200 may be arranged with one another such that like polarity terminals are adjacent one another and the busbars 220 and the busbars 222 define an alternating sequence corresponding to the polarity of the terminals. Examples of alternating sequences of the busbars 220 and the busbars 22 include a substantially linear dispersion of busbars (as shown in FIG. 3).

Figure 7:
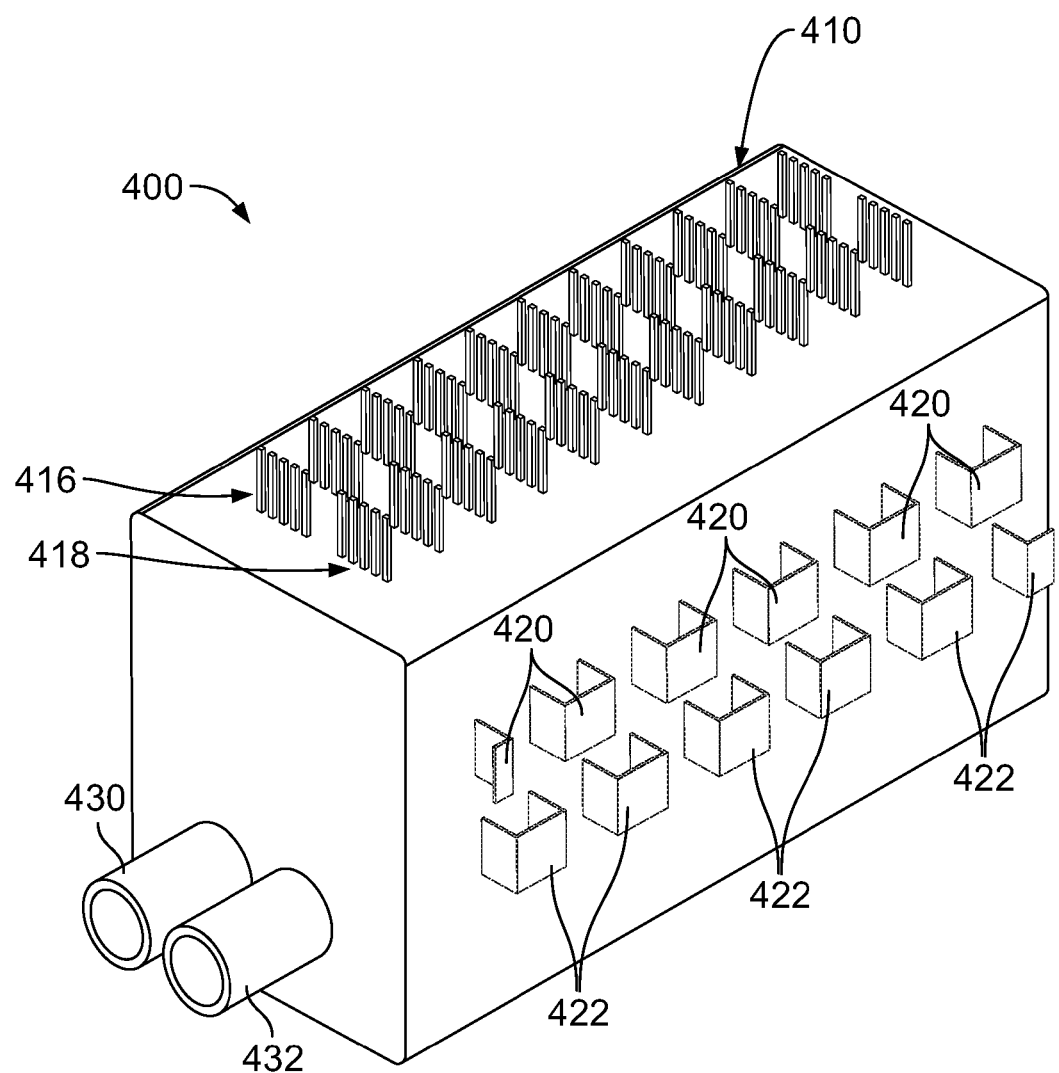
FIG. 7 is a perspective view of an example of a portion of a power module assembly.

FIG. 7 shows another example of a portion of a power module assembly for use with an electrified vehicle, referred to generally as a power module assembly 400 herein. The power module assembly 400 may include a plurality of power stages (not shown) stacked in an array. The power module assembly 400 may include a housing 410 to assist in retaining the power stages therebetween. The housing 410 may include passthroughs for electrical components to extend therethrough. The passthroughs may, for example, be sized for a first series of signal pins 416 and a second series of signal pins 418 to extend therethrough. As another example, the passthroughs may be sized for terminals or busbars to extend therethrough, such as a first set of busbars 420 and a second set of busbars 422.

The busbars 420 and the busbars 422 may be dispersed along a side of the power module assembly 200 to electrically connect like polarity terminals. In this example, the busbars 420 and the busbars 422 are shown in an alternating sequence in which the busbars are offset from one another and dispersed along a side of the power module assembly 400. The busbars 420 and the busbars 422 may be U-shaped. The busbars may each include an outer surface defining a plane coplanar with other planes defined by other outer surfaces of other busbars. The electrical components may be connected to the respective power stage supported within the housing 410. An inlet 430 and an outlet 432 may assist in delivering and removing coolant to manage thermal conditions of the power module assembly 400. In one example, the housing 410 may be a protective layer molded over and covering the plurality of stacked power stages. Terminals, or the busbars 420 and the busbars 422 may extend through the layer. In another example, the housing 410 may be made of frames supporting the power stages.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle power module assembly comprising:
    a horizontally stacked frame array;
    a plurality of power stages, each housed within one of the frames, including a pair of opposite polarity terminals extending external to a respective frame, and arranged such that like polarity terminals are adjacent one another; and
    busbars located external to the frames to electrically connect adjacent pairs of like polarity terminals in a horizontal line orientation relative to a horizontal frame stack orientation.

2. The assembly of claim 1, wherein each of the terminals further defines a surface sized to join electrical components.

3. The assembly of claim 1, wherein the terminals are located on respective power stages such that the busbars are alternately dispersed in a linear sequence along a side face defined by portions of the frames.

4. The assembly of claim 1, wherein the terminals of opposite polarity are offset from one another such that the busbars are alternately dispersed and spaced apart from one another according to terminal polarity along a side face defined by the frames.

5. The assembly of claim 1, wherein the terminals include outer terminals, one on each end of the stacked frames, and wherein the outer terminals are of opposite polarity.

6. The assembly of claim 1, further comprising a protective layer molded over and covering the horizontally stacked frame array such that the terminals extend through the layer.

7. The assembly of claim 1, wherein each of the busbars is secured to terminals of a same polarity of two power stages adjacent one another.

8. A vehicle power module assembly comprising:
    an array of stacked power stages each supported within one of a plurality of horizontally arranged frames defining terminal passthroughs and each including a pair of DC terminals of opposite polarity spaced apart from one another, extending through a respective terminal passthrough, and being arranged relative to one another such that adjacent pairs of like terminals from different power stages are arranged next to one another in a horizontal line orientation;

a first busbar electrically connecting two adjacent positive terminals without contacting one of the plurality of horizontally arranged frames; and a second busbar electrically connecting two adjacent negative terminals without contacting one of the plurality of frames.

9. The assembly of claim 8, wherein each of the first busbar and the second busbar is U-shaped.

10. The assembly of claim 8, wherein each of the first busbar and the second busbar define a surface parallel with a side surface of one of the plurality of horizontally arranged frames, and wherein the surface is sized to facilitate a joining with a connector of a capacitor module.

11. The assembly of claim 8, wherein the array of stacked power stages includes outer power stages adjacent respective endplates, and wherein the terminals proximate the endplates are of opposite polarity from one another.

12. The assembly of claim 8, further comprising a housing defined by a layer molded over and covering the plurality of horizontally arranged frames such that the terminals extend through the layer.

13. The assembly of claim 8, wherein each of the first busbar and the second busbar includes an outer surface defining a plane coplanar with other planes defined by other outer surfaces of other busbars.

14. A vehicle comprising:
an electric machine;
a traction battery electrically connected to the electric machine; and
a power module assembly including
at least two external frames horizontally stacked and each defining one or more terminal passthroughs,
at least two power stages each housed within one of the external frames and electrically connected between the battery and electric machine and each having a pair of DC terminals of opposite polarity extending through one of the one or more terminal passthroughs and a pair of first connectors each connected to one of each of the terminals, and
busbars each having second connectors for electrical connection with the first connectors without contacting the at least two external frames,
wherein the power stages are arranged with one another such that like polarity terminals are adjacent one another and arranged in a horizontal line orientation to define a terminal polarity alternating sequence.

15. The vehicle of claim 14, wherein each of the busbars is U-shaped.

16. The vehicle of claim 14, wherein the second connectors of each busbar are electrically connected to two different power stages with first connectors of same polarity.

17. The vehicle of claim 14, wherein a distance between two adjacent busbars is based on a preselected amount of current and a material of the DC terminals.

18. The vehicle of claim 14, wherein the terminals are located on the respective power stages such that the busbars are alternately dispersed in a linear sequence along a side face defined by portions of the external frames.

19. The vehicle of claim 14, wherein the terminals of opposite polarity are offset from one another such that the busbars are alternately dispersed and spaced apart from one another according to polarity along a side face defined by the external frames.

* * * * *